United States Patent [19]

Barnett

[11] Patent Number: 5,436,893
[45] Date of Patent: Jul. 25, 1995

[54] ATM CELL SWITCH SUITABLE FOR MULTICAST SWITCHING

[75] Inventor: Richard Barnett, Chelmsford, United Kingdom

[73] Assignee: Netcom Limited, Essex, United Kingdom

[21] Appl. No.: 147,939

[22] Filed: Nov. 5, 1993

[30] Foreign Application Priority Data

Dec. 5, 1992 [GB] United Kingdom ............... 9225480

[51] Int. Cl.6 ..................... H04L 12/18; H04L 12/56
[52] U.S. Cl .................................. 370/60.1; 370/94.2
[58] Field of Search ............... 370/60, 60.1, 62, 94.1, 370/94.2, 94.3, 110.1

[56] References Cited

U.S. PATENT DOCUMENTS

| | | | |
|---|---|---|---|
| 4,813,038 | 3/1989 | Lee | 370/60 |
| 4,947,388 | 8/1990 | Kuwahara et al. | 370/94.1 |
| 5,202,885 | 4/1993 | Schrodi et al. | 370/60 |
| 5,229,991 | 7/1993 | Turner | 370/60 |

*Primary Examiner*—Hassan Kizou
*Attorney, Agent, or Firm*—David P. Gordon

[57] ABSTRACT

An ATM cell switch suitable for multicast switching comprises an input stage arranged to detect a multicast cell and to add to the cell header a switch header identifying the outputs to which copies are to be sent, a switch fabric arranged to identify multicast cells, to make identical copies thereof and to route the copies according to the switch header, and an output stage arranged to make further copies according to the data links which are to receive the multicast and to assign the appropriate VPI/VCI to the cell header of each copy according to data stored in said stage.

11 Claims, 2 Drawing Sheets

ATM CELL SWITCH SUITABLE FOR MULTICAST SWITCHING

FIELD OF THE INVENTION

This invention relates to a cell switch for use in an asynchronous transfer mode (ATM) data network, the switch being suitable for multicast cell switching.

BACKGROUND TO THE INVENTION

An ATM network passes data of all types in the form of small, fixed data size cells which do not carry the full data address, but instead have a cell header which carries data identifying only the virtual path and virtual channel for the next switching stage. The virtual path identifier and virtual channel identifier (VPI/VCI) are written to the header at each switching stage according to the virtual path and channel established by the initial switching request. Data identifying the switching virtual path and channel are stored in a switch when a request is made, and these data are used to set the VPI/VCI for each cell during the switching process.

An ATM switch comprises, in general terms, a plurality of link controllers each connected via an input port and an output port to a switch fabric which switches data cells from any input port to any output port. Each link controller has a plurality of data links connected to it. The link controllers comprise input controllers or receivers, whose principal function is simply to receive the bit stream from the external link and to divide it up into cells for presentation to the cell fabric, and output controllers or transmitters, which serve to convert the separate cells from the switch fabric into a continuous bit stream again for forwarding on the appropriate external link.

Typically, data communication will be in the form of singlecast. An commonplace example of singlecast communication is a normal two-party telephone call. The voice of one caller is transferred to the other party and no other. In many data networks, there is increasingly a need for multicast data communication, in which the same data are sent simultaneously to selected stations in the network. The extreme of multicast is broadcast, in which all stations receive the same data, in the same way that television and radio transmissions are broadcasts which anybody with the necessary receiver can receive.

In the case of a point to point ATM connection, cells are relayed from the source to the target without being duplicated, while in a multicast connection, cells from the source are replicated within the network and then separately routed to each destination in turn. Broadcast is the ultimate case, where each cell is copied to each possible destination. Clearly, in any real network, broadcast must be used sparingly.

In ATM multicast, the cells must not only be replicated in the ATM switch, but must also have the correct VPI/VCI assigned to the header for each copy of the cell. These will be different for each cell, since the destinations will all be different. A problem which arises in seeking to implement multicast in ATM networks is that of achieving sufficient speed to avoid the switch becoming a "bottle neck" introducing a delay in the forwarding of the data cells.

Various approaches to multicast switching have been considered. For example, replication of multicast cells can be done at the input stage to the switch, with the copies thus produced then being passed through the switch fabric. A problem with this approach is that the switch fabric itself introduces delays. Alternatively, a copy network could be added to the front of the switch fabric, taking over most of the functions of the input controllers in looking up the VPI/VCI. However, ATM does not permit the sequence of cells to be indicated in the headers; input and output must be in the correct order. This introduces complexity into the copy network and can still give problems with delays.

Another possibility is to use a bus connection between the inputs and the outputs, with the output controllers determining whether a cell on the bus is of interest, and rewriting the VPI/VCI for each cell accordingly. A principal problem with this approach is that the bus must be very fast to compensate for the fact that only one input can "talk" on the bus at any one time. The connections to the bus must therefore run very fast. Delays still arise with this approach.

To try to overcome the problems of a bus, while still retaining the advantages, a ring could be used. This would avoid the "one-at-a-time" limitation of the bus, and would therefore permit the speed to increase. However, rings are very susceptible to failure.

SUMMARY OF THE INVENTION

The present invention avoids the difficulties of these approaches by detecting a multicast cell at the input stage to the switch, and adding to the cell header a switch header identifying the outputs to which copies are to be sent, making identical copies of the cell within the switch fabric and routing the copies according to the switch header, with further copies being made by the output controllers according to the links to each controller which are to receive the multicast, and assigning the appropriate VPI/VCI at the output controllers.

A preferred aspect of the invention provides an ATM cell switch suitable for multicast switching, the switch having a plurality of link controllers each connected via an input port and an output port to a dynamic crosspoint switch controllable by a switch controller to switch data cells from any input port to any output port, each link controller having a plurality of external data links thereto and being arranged to read the VPI/VCI entries for each data cell received from an external link, to determine from data stored in said link controller the VPI/VCI values for the cell within the switch and to write these to the cell, to attach a switch header determining which of the link controllers is to receive the cell and to which of the external links to that controller the cell is to be passed, and then to pass the cell to the crosspoint switch, the link controller also being arranged to read the VPI/VCI entries for each data cell received via the output port and, for a cell identified as a multicast cell, to copy the cell to each link identified in the switch header, attaching to each copy new VPI/VCI values determined from data stored in said link controller.

The key advantage of the approach of the present invention is that it enables the switch fabric to be kept simple. No VPI/VCI mapping tables have to be kept in the switch fabric, and no complex processing is required at all. The result is that the switch fabric is low in cost, efficient and involves minimal transit delay. While more intelligence is required in the link controllers in the switch of the present invention, this is not a disadvantage, since intelligence in the form of a hardware engine to implement traffic policing, for example, would still be required, and since this needs VPI/VCI tables at the link controller, relatively little extra processing power is required to perform the cell header rewriting at the same time. The alternative would be to implement traffic policing within the switch fabric, but this would involve lower efficiency, since cells which eventually have to be discarded will still need to be forwarded to the switch fabric, whereas with the switch of the present invention, only those cells which need to be switched are forwarded.

Since the same tables can be used for received and transmitted cells in the link controllers, the extra VPI/VCI rewriting step at the transmitter involves no great storage overhead. Replicating the cells at the transmitter itself means that only one cell is ever transferred from the switch fabric to the link controller however many times the cell has to be replicated on the outgoing physical links by that link controller. Since it is assumed that the outgoing links are not overloaded (if they were, cells would be lost anyway), the transmitter engines would be idle if they were not copying multicast cells, so this adds no extra overhead to the switch.

Another advantage of the switch of the present invention is that it permits repeated replication of cells down the same link, each being assigned an individual VPI/VCI.

DESCRIPTION OF THE ILLUSTRATED EMBODIMENTS

Figure 1:
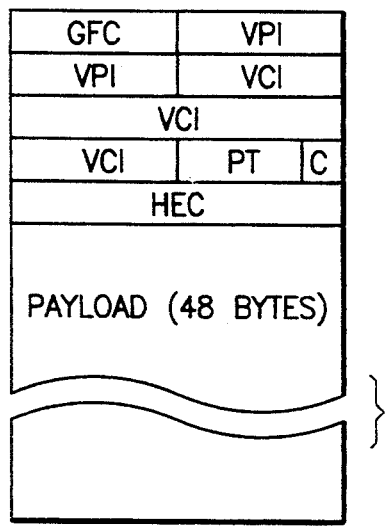
FIG. 1 illustrates diagrammatically a typical ATM cell.

As illustrated in FIG. 1, the conventional standard ATM cell contains 53 bytes, of which 48 are payload and 5 form the information used by the ATM layer of the network. In the header, six fields of data are provided, as follows:

GFC=Generic Flow Control (The precise use of this field has not yet been defined, and so the value will always be zero)

VPI=Virtual Path Identifier (8 bits)

VCI=Virtual Channel Identifier (16 bits)

PT=Payload Type

C=Cell Loss Priority (if this bit is set, the cell is a low priority cell and can be discarded in times of congestion within the network)

HEC=Header Error Control (A byte generated by a cyclic code calculated from the first four header bytes of the cell. Provides a method of finding cell boundaries. The receiver, at an arbitrary point in the bit stream, starts the HEC calculation process. If the header checksum proves correct, the receiver must have started on a cell boundary, and so has achieved synchronisation. If not, it slips one bit and tries again. This process guarantees that synchronisation will be achieved within a finite number of cells.)

The VPI and VCI have significance over only a single hop in the network and are not global. Therefore, each ATM switch in the path between two endpoints will rewrite the VPI and VCI fields.

Figure 2:
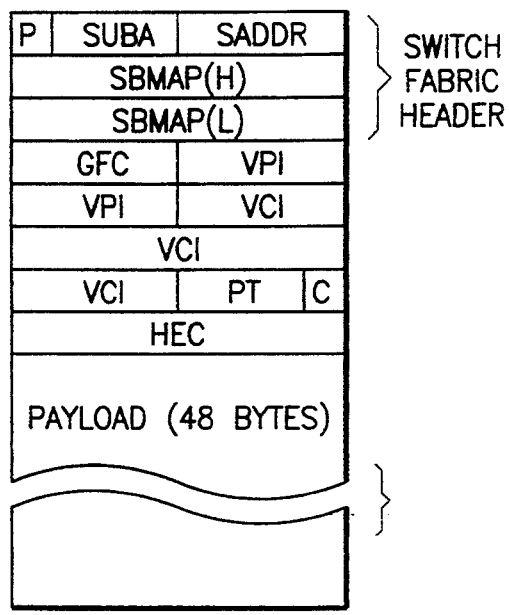
FIG. 2 is a diagrammatic representation of an ATM cell within a switch in accordance with the invention.

FIG. 2 shows the same cell after addition by the switch of the invention as hereinafter described of a three-byte switch fabric header, in which:

P=priority bit indicating whether the cell is of low or high priority. This can be used by the switch fabric to allow cells to overtake others in queues.

SUBA=Sub-Address, which indicates to which logical link on the target link controller the cell is destined. Each link controller is able to support up to four physical links to the outside world. In addition, there is an internal port that allows access to the link controller's management facilities. The supported values are as follows:

000: Destination is link 0.
001: Destination is link 1.
010: Destination is link 2.
011: Destination is link 3.
100: Unused (reserved).
101: Unused (reserved).
110: Multicast.
111: Destination is internal port.

SADDR=Slot Address is the number of the target link controller to which the cell is to be sent. (This is not used in the switch of the invention, the Slot Bitmap being used instead)

SBMAP(H)=Slot Bitmap (high byte)

SBMAP(L)=Slot Bitmap (low byte) (The slot bitmap field is used to determine the slot controllers to which the cell is to be forwarded. Each of the sixteen possible slot controllers has a bit in this field and the identical copies of the cells are forwarded to each one simultaneously.)

Figure 3:
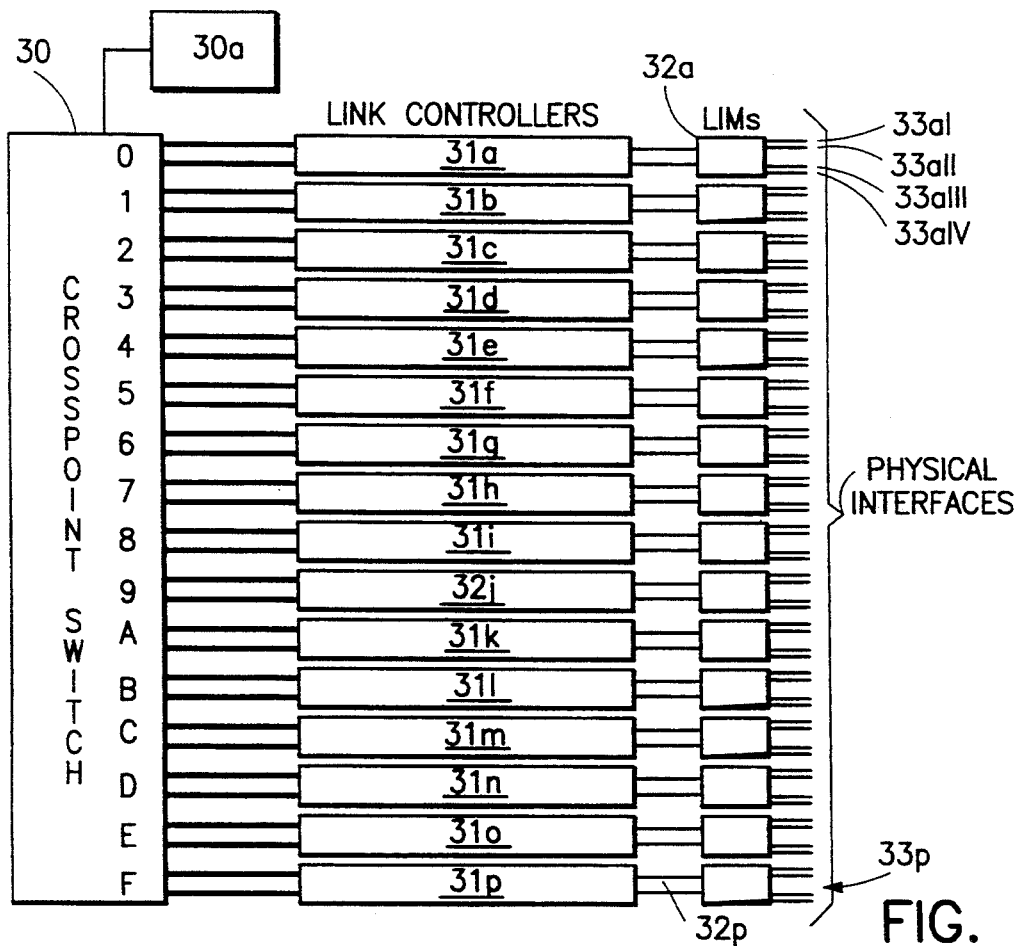
FIG. 3 is a diagram of a switch in accordance with a preferred embodiment of the invention.

FIG. 3 illustrates a typical ATM switch in accordance with the invention. The switch is a 16×16 switch, but it will be appreciated that other configurations may also be employed. It comprises a crosspoint switch 30 to which sixteen link controllers 31a to 31p are connected via 9-bit input and output ports. The link controllers 31a to 31p each have a physical interface 32a to 32p to four external links 33aI–IV to 33pI–IV. Each link controller 31 has associated memory in which is stored data relating to the currently set-up virtual paths and virtual channels through the switch. These are changed with each request for switching.

Figure 4:
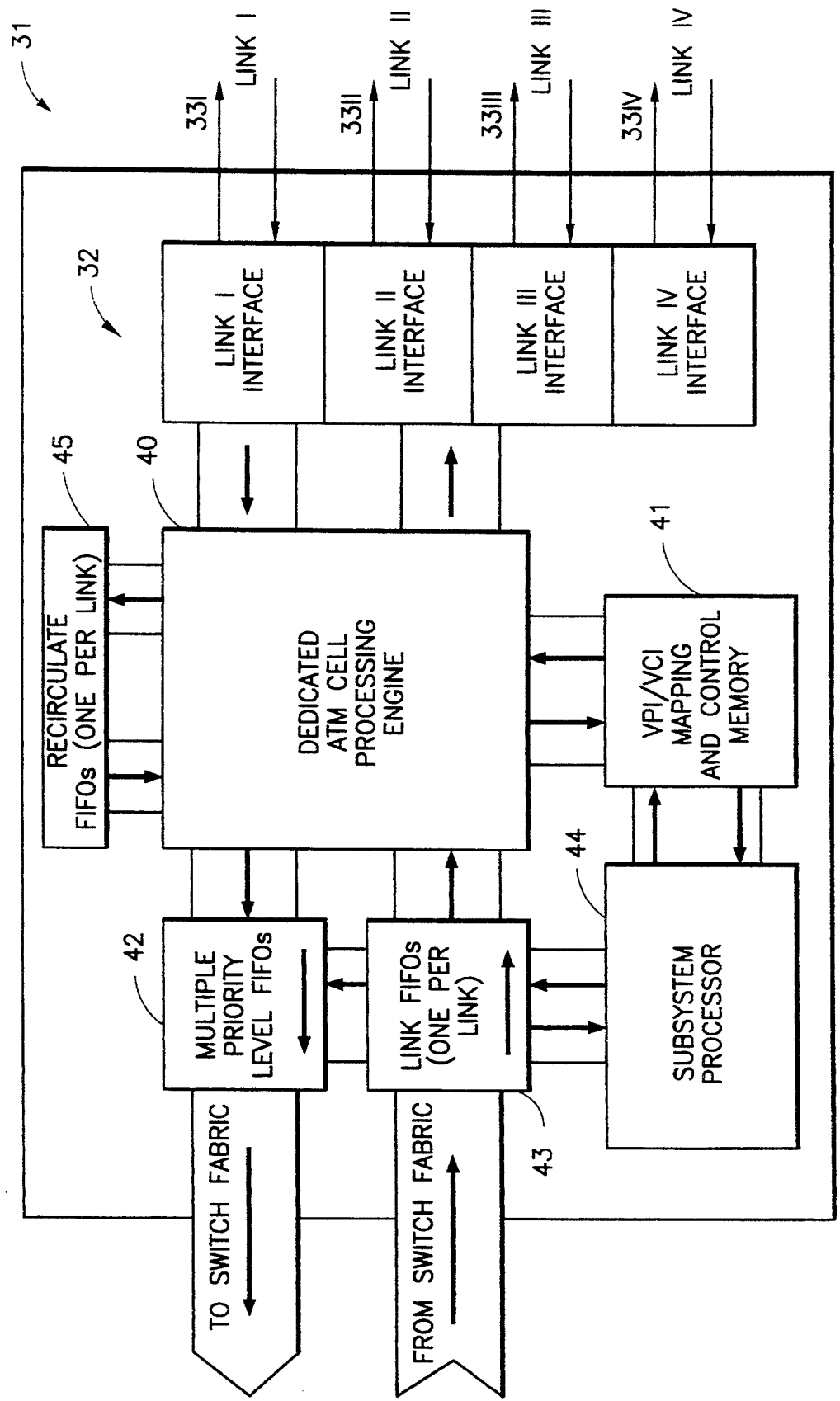
FIG. 4 is a block diagram of a switch link controller forming part of the switch of FIG. 3.

A link controller 31 is illustrated in more detail in FIG. 4. Each controller 31 has a dedicated processor with a VPI/VCI mapping and control memory 41 associated therewith. Four external data links 33I to 33IV are shown connected to the processor 40 through respective interfaces 32, but in some applications links 33III and 33IV may not be present. Cells are passed from the processor 40 to the switch fabric via a plurality of priority level FIFOs 42, whose function is to allow access of the cells to the switch fabric in order of cell priority as indicated by the priority bit P, thus effectively permitting one cell to overtake another at this stage. Conveniently, three priority level FIFOs 42 are provided. Cells arriving at the link controller from the switch fabric are allocated to the appropriate ones of a plurality of link FIFOs 43, one being provided for each external link 33, with an additional FIFO corresponding to the internal port hereinbefore referred to in connection with the SUBA field in the switch header. In the case of a multicast being indicated by the SUBA field, each of the link FIFOs 43 receives a copy of the cell. A subsystem processor 44 is provided to control the contents of the memory 41, receiving new VPI/VCI mapping data according to each new VPI/VCI set up and writing these to the memory. Finally, to permit a multicast cell to be repeated many times down one external link, each time with its own VPI/VCI, a plurality of recirculate FIFOs 45, one for each external link, are provided. When a cell is to be repeated on the same link, it is written by the controller 40 to the link and at the same time to the appropriate recirculate FIFO 45, so that the cell is represented to the processor. In writing to the recirculate FIFO, the VCI number is incremented by one, so that when it is represented to the processor 40, the cell's VPI/VCI entry can be determined simply by looking up the next VCI table entry; the processor does not have to retain the VCI number itself.

The operation of the switch is as follows. The first step when receiving a cell is for the link controller 31 to inspect the VPI and VCI fields. This is used as an index into a table of pointers, each of which points to an array of data structures for all the virtual channels (VCs) that are supported in each virtual path (VP). If a pointer is null, no VCs are supported in that VP.

Provided that the pointer is not null, the link controller inspects the VCI field of the cell and uses this as an index into the VC table for that VP. If that entry indicates that the VC is an active one, the VPI/VCI fields of the cell are rewritten with the new values indicated in the VC entry, the HEC is recalculated, and the switch header is attached before the cell is sent to the switch fabric 30.

The switch fabric 30 inspects the slot bitmap field to see which link controller slots need to be sent copies of the cell. For each link controller 31 that receives the cell, the VPI is inspected and used to locate the VC table entry. If the pointer is null, the cell is discarded. An important point to note is that non-multicast cells are only added to the queue for the target link indicated in the subaddress field of the switch fabric header of the cell. Multicast cells (indicated by the value 6 in this field) are added to all link queues within the target link controller, as hereinbefore described, for later filtering as required. The VCI from the received cell is then used to locate the appropriate entry in the VC table. The entry is examined to see if it is a multicast type entry (this is a special type of entry). If not, the cell is forwarded unmodified on the outgoing link (this is the normal singlecast case). If the entry is a multicast type, the cell is rewritten with the VPI/VCI from the entry, the HEC is recalculated, and the cell transmitted on the outgoing link and also written to the recirculate FIFO 45. As hereinbefore explained, the VCI number is incremented by one in this step, so that when it is re-presented to the processor 40, the cell's VPI/VCI entry can be determined simply by looking up the next VCI table entry. This is repeated until all the relevant entries in the table have been fulfilled. This results in n copies of the cell being sent on the same physical link but with different VPI/VCI values.

I claim:

1. An ATM cell switch suitable for multicast switching in an ATM data network in which data cells are exchanged, each cell having a payload and a cell header, the cell header including a virtual path identifier and a virtual channel identifier which identify the destination of the cell, said switch comprising:
   a) a crosspoint switch having a plurality of input ports and a plurality of output ports;
   b) a plurality of link controllers, each of said link controllers being coupled to one of said plurality of input ports and one of said plurality of output ports, each of said link controllers including
      i) input-output means for receiving and transmitting cells from and to at least one external data link;
      ii) addressing means for changing the virtual path identifiers and virtual channel identifiers in the cell header of the received cells;
      iii) means for adding an additional identifier to the cell header of a received cell which is to be multicast, identifying particular ones of said link controllers, such that said crosspoint switch receives said cell which is to be multicast and causes copies of said received cell to be provided to said particular ones of said link controllers for output by said input-output means of said link controllers.

2. An ATM cell switch according to claim 1, wherein:
   said addressing means comprises a mapping memory means which changes the virtual path identifier and virtual channel identifiers of the received cells to other virtual path identifiers and virtual channel identifiers.

3. An ATM cell switch according to claim 1, wherein:
   said additional identifier includes a plurality of first bits indicating to which particular ones of said plurality of link controllers said cell which is to be multicast is to be sent via said output ports of said crosspoint switch, wherein said first bits cause said crosspoint switch to copy said cell which is to be multicast to said particular ones of said plurality of link controllers.

4. An ATM cell switch according to claim 3, wherein:
   said additional identifier comprises at least one second bit which identifies said cell as a multicast cell, wherein said addressing means uses said at least one second bit to determine whether said cell is a multicast cell.

5. An ATM cell switch according to claim 4, wherein:
   said ATM cell switch further comprises a plurality of buffers coupled between each output port of said crosspoint switch and a corresponding link controller, wherein said plurality of buffers correspond to said plurality of external data links with each buffer receiving a copy of said multicast cell from said crosspoint switch.

6. An ATM cell switch according to claim 5, wherein:
   said addressing means comprises a mapping memory means which takes the virtual path identifier and virtual channel identifier of the multicast cells received from said plurality of buffers and changes them to different virtual path identifiers and virtual channel identifiers.

7. An ATM cell switch according to claim 1, wherein:
   said additional identifier includes a priority identifier and each of said link controllers further includes means for detecting said priority identifier.

8. A method of multicast ATM switching in an ATM data network in which data cells are exchanged, each cell having a payload and a cell header, the cell header including a virtual path identifier and a virtual channel identifier which identify the destination of the cell, using an ATM cell switch having a crosspoint switch coupled to a plurality of link controllers, where each of said link controllers is coupled to at least one external data link, and each of the link controllers includes means for reading a cell header of an incoming ATM cell and means for altering the cell header to cause the crosspoint switch to write the cell which is to be multicast to a plurality of the link controllers; said method comprising:

a) determining, in a first link controller, whether an incoming cell is to be processed as a multicast cell;

b) altering, in the first link controller, the header of the multicast cell to indicate which two or more link controllers of said plurality of link controllers are to receive the multicast cell;

c) receiving and copying in the crosspoint switch, the multicast cell with altered header, and writing copies of the multicast cell with the altered header to the indicated two or more link controllers.

9. A method according to claim 8, further comprising:

d) changing the altered header of the multicast cell in each of the indicated link controllers to provide each multicast cell with a new virtual path identifier and virtual channel identifier.

10. A method according to claim 8, where at least one of the indicated link controllers is coupled to a plurality of external data links, said method further comprising:

d) providing a plurality of copies of the multicast cell to the at least one of the indicated link controllers; and e) outputting said plurality of copies of the multicast cell form the at leash one of the indicated link controllers to the plurality of external data links.

11. A method according to claim 10, further comprising:

f) for each copy of the multicast cell, changing the altered header of that copy of the multicast cell to provide each copy of the multicast cell with a new virtual path identifier and virtual channel identifier, prior to outputting said plurality of copies to the external data links.

* * * * *